United States Patent
Blanvillain

(10) Patent No.: US 6,591,953 B2
(45) Date of Patent: Jul. 15, 2003

(54) PICK UP DEVICE FOR PANTOGRAPH

(75) Inventor: Gérard Blanvillain, Veretz (FR)

(73) Assignee: Faiveley Transport, Saint-Denis (FR)

( * ) Notice: Subject to any disclaimer, the term of this patent is extended or adjusted under 35 U.S.C. 154(b) by 0 days.

(21) Appl. No.: 10/027,206

(22) Filed: Dec. 26, 2001

(65) Prior Publication Data

US 2002/0086558 A1 Jul. 4, 2002

(30) Foreign Application Priority Data

Dec. 29, 2000 (FR) .......................................... 00 17304

(51) Int. Cl.⁷ ................................................. B60L 5/00
(52) U.S. Cl. ...................... 191/60.2; 191/60; 191/60.3; 191/57; 191/59
(58) Field of Search ........................ 248/694; 191/60.2, 191/60, 60.3, 57, 59

(56) References Cited

U.S. PATENT DOCUMENTS

| | | | | | |
|---|---|---|---|---|---|
| 1,480,835 | A | * | 1/1924 | Price ........................ | 191/60.2 |
| 1,558,832 | A | * | 10/1925 | Burnham ..................... | 191/57 |
| 1,692,893 | A | * | 11/1928 | Gutzat ........................ | 191/58 |
| 3,761,648 | A | * | 9/1973 | Horstmeier et al. .......... | 191/70 |
| 3,823,278 | A | * | 7/1974 | Gray ........................... | 191/66 |
| 3,830,990 | A | * | 8/1974 | Gray ........................... | 191/55 |
| 5,087,797 | A | * | 2/1992 | Blanvillain et al. .......... | 191/66 |
| 5,124,510 | A | * | 6/1992 | Garfinkle .................... | 191/65 |
| 5,735,374 | A | * | 4/1998 | Breitbach et al. ............. | 191/54 |
| 6,418,397 | B1 | * | 7/2002 | Brand et al. ................. | 702/168 |

FOREIGN PATENT DOCUMENTS

| | | | | |
|---|---|---|---|---|
| DE | 31 38 264 A1 | 1/1983 | ............. | B60L/5/22 |
| DE | 295 321 A5 | 10/1991 | ............. | B60L/5/30 |
| DE | 42 01 788 A1 | 8/1992 | ............. | B60L/5/20 |
| DE | 42 19 112 A1 | 12/1993 | ............. | B60L/5/20 |

* cited by examiner

Primary Examiner—Leslie A. Braun
(74) Attorney, Agent, or Firm—Nawrocki, Rooney & Sivertson, P.A.

(57) ABSTRACT

A pick-up device (2) for a pantograph (1) comprising two rubbing strips (3) connected together by at least one cross-member (4) connected to and articulated on a stabilizing link (5) on the pantograph (1). Each of the rubbing strips (3) is connected to the cross-member (4) by a lever (7) able to pivot in order to make the rubbing strip (3) tilt under the effect of a given force encountered by the rubbing strip (3).

9 Claims, 2 Drawing Sheets

PICK UP DEVICE FOR PANTOGRAPH

BACKGROUND OF THE INVENTION

The invention relates to a pick-up device for a pantograph providing protection of the top part of the pantograph and of the catenary in the event of impact.

SUMMARY OF THE INVENTION

Notably this device makes it possible to avoid the partial or complete destruction of the pantograph and catenary when a fault or irregularity on the catenary occurs, whilst ensuring electrical continuity in picking up the current.

For this purpose, the invention relates to a pick-up device for a pantograph comprising two rubbing strips connected together by at least one cross-member, characterised in that each of the rubbing strips is connected to the said cross-member by a lever able to pivot in order to make the said friction strip tilt in a direction substantially perpendicular to the said rubbing strips, under the effect of a given force encountered by the said rubbing strip during its movement, whatever the direction of the movement.

Thus, under the effect of an excessive longitudinal force applied to the rubbing strips, the device allows the tilting of the levers, which prevents the rubbing strips or the whole of the pantograph being damaged.

BRIEF DESCRIPTION OF THE DRAWINGS

Other objects and advantages will emerge during the following description, with reference to the accompanying drawings, given by way of non-limitative examples, in which.

Figure 1:
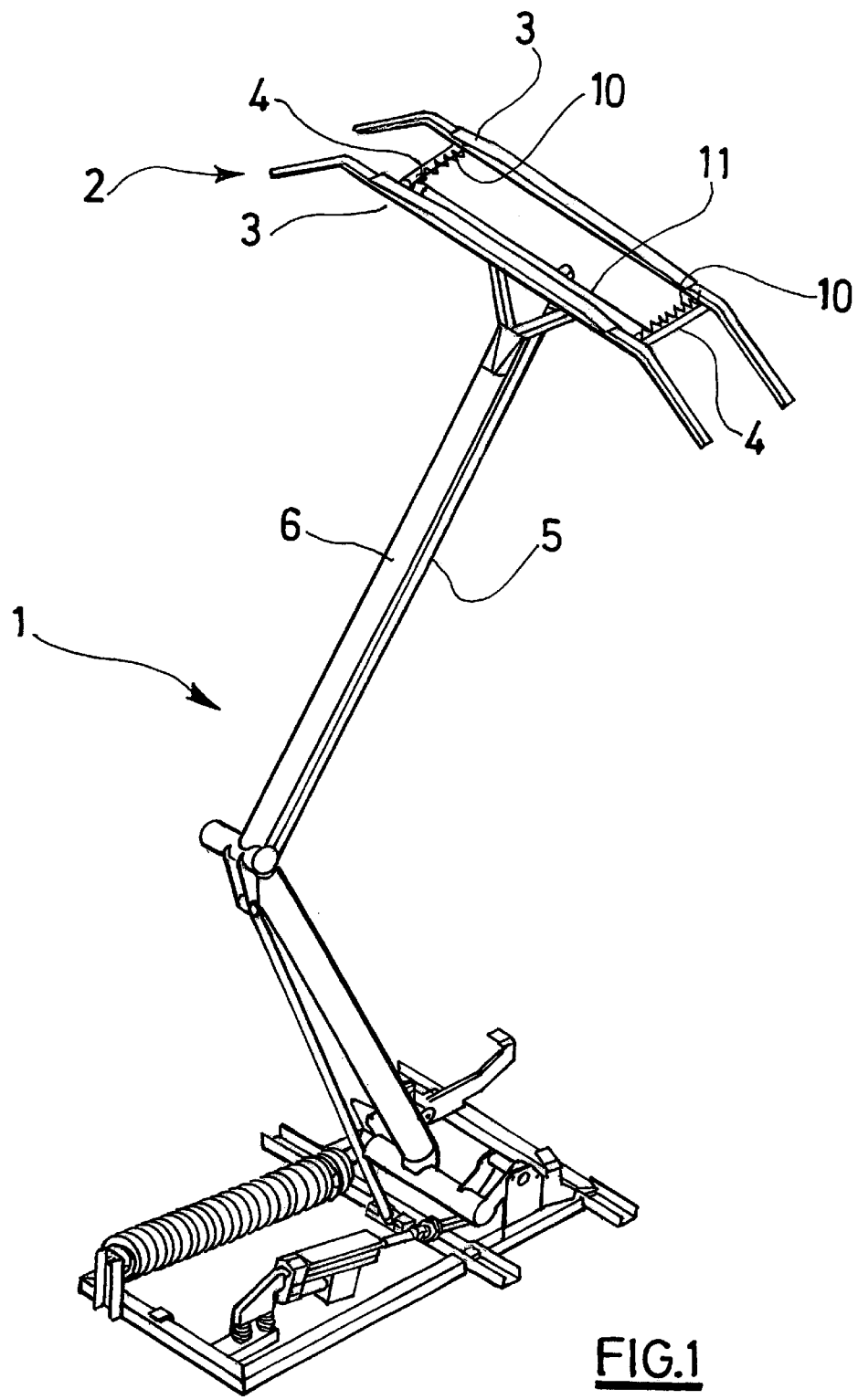
FIG. 1 depicts a pantograph comprising the pick-up device according to the invention.

A pantograph 1 comprises a pick-up device 2 according to the invention.

The pick-up device 2 comprises two rubbing strips 3 connected together by at least one cross-member 4.

In the embodiment depicted in the figures, two cross-members 4 connect two rubbing strips 3.

These cross-members 4 are preferably situated at the ends of the rubbing strips 3 and are perpendicular to them.

The cross-members 4 are connected together by a bar on which a stabilizing link 5 is articulated.

Each of the rubbing strips 3 is connected to the cross-members 4 by a lever 7.

Figure 3:
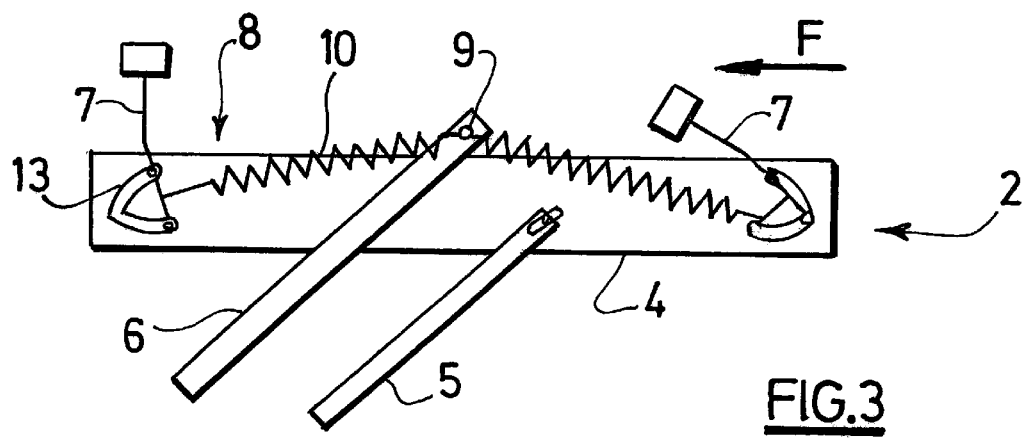
FIG. 3 depicts schematically the pick-up device according to the invention under the effect of a longitudinal force F.
Figure 4:
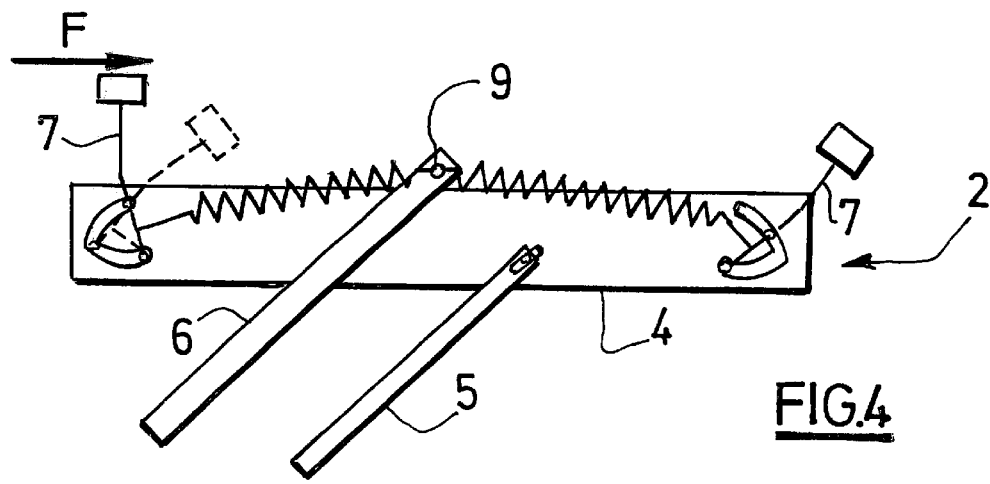
FIG. 4 depicts schematically the pick-up device according to the invention under the effect of a longitudinal force F in the opposite direction to that depicted in FIG. 3.

This lever 7 can pivot in order to make the said rubbing strip 3 tilt under the effect of a given force F encountered by the said rubbing strip 3 when it moves, as depicted in FIGS. 3 and 4.

The rubbing strips tilt in a direction which is substantially perpendicular to them in one direction or the other.

Each of the levers 7 is connected to elastic return means 8 which are themselves connected to a fixed point 9 situated between two levers 7 on the same side of the pick-up device.

These elastic means 8 are for example springs 10. These springs can for example be of the type with coiled turns or blades.

However, other elastic return means 8 can be envisaged, such as for example hydraulic or pneumatic jacks or similar, or any other elastic device for fulfilling an identical function.

The fixed point 9 is situated on a fixed bar 11 extending perpendicularly to the cross-members 4 and fixed to the ends of the top arm 6 of the pantograph 1.

Each lever 7 on a friction strip 3 is connected to the cross-member 4 by means of two fingers 12 spaced apart.

These fingers 12 extend perpendicular to the longitudinal direction of the cross-members 4.

These two fingers 12 are engaged in an aperture 13 which is curved in shape.

This aperture is situated at the end of a cross-member 4.

Figure 2:
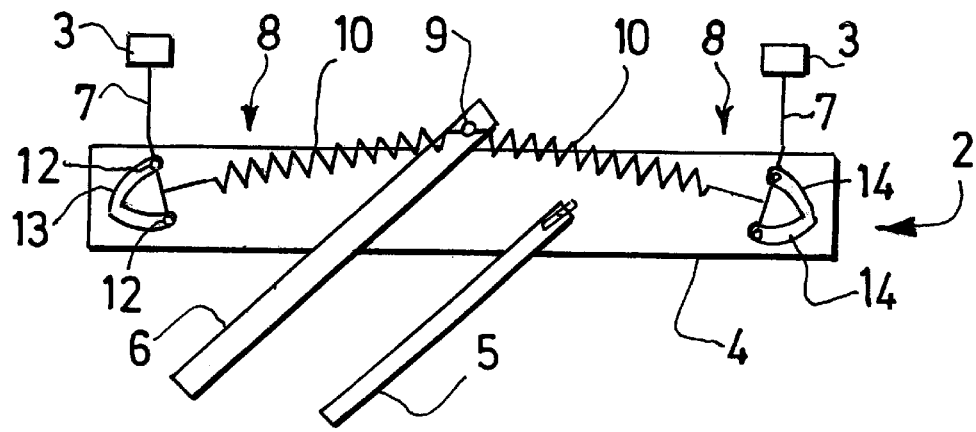
FIG. 2 depicts schematically a profile view of the pick-up device according to the invention, the rubbing strips being in a position of stable equilibrium.

The force exerted by the spring 10 tends to keep the two fingers 12 in abutment against the ends of the said curved aperture 13 when no force is being applied to the friction strips 3 as depicted in FIG. 2.

Each aperture 13 has a convexity directed in a direction opposite to the spring 10 and substantially symmetrical with the direction of the said spring 10 in the absence of any force exerted on the rubbing strips (FIG. 2).

The slot 13 comprises notably two portions of arcs 14 which are joined at a position situated on the said axis of symmetry.

The radius of curvature of each of the two portions of arcs 14 is equal to the distance between the two fingers 12 in the absence of any force being exerted.

The end of each spring 10 opposite to the fixed point 9 is fixed to the corresponding lever 7 approximately halfway between the two fingers 12 of the said lever 7.

The device according to the invention functions as follows:

When no force is being exerted on the rubbing strips 3, the latter are situated in a substantially horizontal plane as depicted in FIG. 2.

In FIGS. 3 and 4, the arrow represents the force applied to one of the rubbing strips 3 (or both of them).

In FIG. 3, the force applied F exerts a stress on one of the rubbing strips 3 causing the tilting thereof towards the centre of the pick-up device 2 in a direction substantially perpendicular to the rubbing strip. The finger situated at the top end of the curved aperture 13 then serves as a centre of rotation for the corresponding lever 7.

Simultaneously the bottom finger 12 follows the bottom portion of an arc 14 as far as its other end. The travel of the finger 12 is therefore limited by the length of the portion of an arc 14 along which it travels.

This prevents the rubbing strip 3 from coming into contact with other elements of the pick-up device 2 when it tilts.

In a similar fashion, FIG. 4 depicts the effect of a longitudinal force applied in the opposite direction to the rubbing strips 3 causing the tilting of the one of the rubbing strips 3 (depicted in solid lines) towards the outside of the pick-up device 2, and the tilting of the other rubbing strip 3 (depicted in dotted lines) towards the inside of the pick-up device 2, in a direction substantially perpendicular to the rubbing strips.

According to the direction of tilting of the rubbing strip 3, the bottom or top finger 12 fulfills the role of a centre of symmetry, the other finger 12 traveling along its portion of an arc 14.

When the forces applied to the rubbing strips 3 cease, the rubbing strips are returned to their nominal position by the force of the springs 10 (FIG. 2).

In the embodiment depicted in the figures, two springs 10 are mounted in opposition at the ends of each rubbing strip 3.

These two springs 10 procure a slight stiffness in the vertical direction and a strong stiffness in the horizontal direction, thus providing a flexible connection with the stabilizing link 5 and the top arm 6 of the pantograph and thus providing the suspension of the pick-up device 2 with respect to the said arms.

In fact the two springs 10 combine the restoring effect of the levers and the suspension of the rubbing strips on the pantograph.

The strong stiffness procured in the longitudinal direction enables the levers 7 to be held firmly in their idle position, the slight stiffness in the vertical direction ensuring an optimum pick-up quality.

Other embodiments of the pick-up device 2 according to the invention can be envisaged without departing from the scope of the invention.

For example, the levers 7 could be connected to the cross-members by a single rotation shaft, elastic stops then being disposed on each side of the lever on the cross-member in order to limit the travel of the lever 7 when the latter moves.

What is claimed is:

1. A pick-up device for a pantograph (1) comprising two rubbing strips (3) connected together by at least one cross-member (4) articulated on a stabilizing link (5) on the pantograph, characterized in that each of the rubbing strips (3) is connected to the said cross-member (4) by a lever (7) able to pivot in order to make the said rubbing strip (3) tilt in a direction substantially perpendicular to the said strips (3) under the effect of a given force (F) encountered by the said rubbing strip (3).

2. A device according to claim 1, characterized in that each of the levers (7) is are connected to elastic return means (8) which are themselves connected to a fixed point (9) situated between the two levers (7).

3. A device according to claim 2, characterized in that the elastic return means (8) are springs (10).

4. A pick-up device (2) according to claim 2, characterized in that the fixed point (9) is situated on a fixed bar (11) extending perpendicularly to the cross-member (4).

5. A device according to claim 2, characterized in that the fixed point (9) is situated on a fixed bar (11) extending perpendicular to two cross-members (4), each connecting the opposite ends of the two rubbing strips (3).

6. A device according to claim 1, characterized in that each lever (7) on a rubbing strip 3) is connected to the cross-member (4) by means of two spaced-apart fingers (12) engaged in a curved aperture (13), the force exerted by the spring (10) tending to keep the two fingers (12) in abutment against the ends of the curved aperture (13) when no force is being applied to the rubbing strips (3).

7. A device according to claim 6, characterized in that the aperture (13) with a convexity directed in a direction opposite to the spring (10) is substantially symmetrical with respect to the direction of the said spring (10) when no force is being exerted on the rubbing strips (3).

8. A device according to claim 6, characterised in that the aperture (13) comprises two portions of arcs (14) which join at a point.

9. A device according to claim 8, characterized in that the radius of curvature of each of the two portions of arcs (14) is equal to the distance between the two fingers (12) when no force is being applied to the rubbing strips (3).

* * * * *